United States Patent Office 3,340,215
Patented Sept. 5, 1967

3,340,215
CONDENSATES OF AMINOPLAST-SULFONATED
PHENOLIC COMPOUNDS
Lucien Sellet, Saddle River, N.J., assignor to Nopco
Chemical Company, a corporation of New Jersey
No Drawing. Filed Sept. 27, 1962, Ser. No. 226,718
22 Claims. (Cl. 260—29.4)

The present invention relates to novel high molecular weight anionic condensates and products prepared therefrom and a process for producing the condensate and its related products. The invention also includes a novel method for the treatment of materials penetratable or porous in nature with said condensates and its related products alone or in combination with water dispersible nonionic treating agents, said methods and products being of particular importance in the leather making process.

It is an object of the present invention to provide for novel water soluble treating agents especially for porous or fibrous substrates. It is a further object to provide novel water soluble treating agents which when applied to porous or fibrous substrates bring about enhanced properties of said substrates. It is a further object to provide products which are particularly useful in the leather making process. It is another object of this invention to provide products which are useful as dispersing agents, dye assistants, pretanning agents, tanning agents and retanning agents. Another object of this invention is to provide procedures for preparing said novel treating agents. A still further objects of this invention is to provide for improved leather, paper, and textile treating agents which impart improved properties when applied to said substrates in such operations as pretanning, tanning, retanning, dyeing and pigment dispersing. A still further object is to provide for a water soluble treating agent that can impart water solubility to nonionic materials which have poor water solubility. Other objects will become apparent from the detailed description given hereinafter. It is intended, however, that the detailed description and specific examples do not limit the invention but merely indicate preferred embodiments thereof since various changes and modifications within the scope of the invention will become apparent to those skilled in the art.

The above as well as other objects have been most unexpectedly and successfully achieved in the following manner. I have prepared and utilized in the treatment of various substrates such as leather and in the solubilization and dispersion of many materials, products of water soluble condensates of high molecular weight resinous polymers of urea and formaldehyde with a sulfonated phenolic compound such as those selected from the group consisting of sulfonated phenols, sulfonated cresols, sulfonated xylenols and mixtures thereof. More particularly, my invention relates to water soluble anionic polymeric condensates and products produced therefrom, said condensate being produced by condensing in an aqueous medium at temperatures of from about 70° to about 102° C., a mixture composed of a (1) substantially water insoluble resinous prepolymers formed by reacting approximately 1 to 4 moles of formaldehyde with 1 mole of urea at pH's below 4, with (2) a sulfonated phenolic component containing approximately 0.7 to 2 moles per mole of urea used in formulating the prepolymer, of a sulfonated phenolic compound, said sulfonated phenolic component having a total hydrogen ion concentration of from about 8% to 24%, calculated as weight percent sulfuric acid, based on the total weight of the sulfonated phenolic component with the proviso that when the prepolymer is formed by utilizing one mole of formaldehyde per mole of urea, the total hydrogen ion concentration of the component should be from about 12% to 24%, calculated as weight percent sulfuric acid, based on the total weight of the component. This condensation reaction of the prepolymer and the sulfonated phenolic compound is carried out by reacting for a period of time of from the formation of a clear solution which indicates the initial condensation stage, until about 4 hours after the formation of a clear solution. By varying the heating time and the temperature of the condensation reaction of the prepolymer and the sulfonated phenolic compound, the mole ratios of formaldehyde to urea in the prepolymer, the hydrogen ion concentration of the aqueous solution, the final properties of the condensate can be controlled so as to produce products having desired predetermined properties for use as tanning agents, pretanning agents, retanning agents, auxiliary tanning agents, dispersing or solubilizing agents. By utilizing this procedure, I have found that condensates can be produced having controlled molecular sizes and weights depending upon the desired use of the condensate.

It has been found that through this condensation reaction, the degree of polymerization of the urea-formaldehyde resin and the sulfonated phenolic compound can be controlled so as to produce a final condensate having predetermined characteristics and properties. If it is desired to stop the reaction at the initial or first stage of condensation, the mixture of the water insoluble polymeric urea formaldehyde resin and sulfonated phenolic compound is heated to a temperature of from about 70° to 102° C., preferably from about 83° to 85° C., until the formation of a clear solution, indicating the formation of a water soluble condensate. The condensation reaction can then be stopped by cooling this clear solution to room temperature. The pH of the final product can be adjusted to various levels depending upon the desired use. If a higher polymeric product is desired, this clear solution is heated to a temperature of from about 70° to 102° C., preferably between 83° to 85° C., under the aforementioned conditions, for a predetermined period of time. Any desired degree of polymerization of this condensate may be produced by carrying out the original reaction of the substantially water insoluble urea-formaldehyde resin and the sulfonated phenolic compound for a predetermined period of time after formation of the clear solution and then stopping the polymerization reaction by cooling the condensate to room temperature or below. The pH of this final product may be adjusted to any desired level.

It has been found that products produced by the second polymerization stage, i.e., carrying out the condensation reaction of the sulfonated phenolic compound with the substantially water insoluble urea-formaldehyde prepolymer for a period of time after the formation of the clear solution until two hours after the formation of the clear solution, as well as products of the first condensation stage, i.e., where the condensation reaction is carried out until the formation of a clear solution, are excellent pretanning agents, retanning agents, tanning agents and auxiliary tanning agents for preparing improved leather products. For example the products prepared by the first condensation stage impart to leather outstanding light fastness, increased fullness, enhanced tensile strength and smooth grain. These products have excellent penetratability into the leather. Also these products can be successfully used in such diverse applications in the tanning industry as in the preparation of garments, shoes, gloves, suedes and mechanical leathers.

During the second condensation stage, heating may be stopped and the product cooled at anytime up to two hours after the formation of a clear solution depending upon the degree of polymerization desired. This is true since the tanning characteristics and other properties of this condensate vary depending upon the degree of polymerization. This is shown by the fact that if a pretanning agent, tanning agent, retanning agent, with good penetration is desired, it is preferred to stop the polymerization reaction as soon as possible after the formation of the clear solution so that a low molecular product can be obtained. If a pretanning agent, tanning agent, retanning agent is desired which will give a tighter grain and increased bleach to the leather, then the condensation should be continued, so as to obtain a higher polymerization product, by heating at definite temperature levels for generally up to two hours. Hence by regulating the time and temperature of condensation of the urea-formaldehyde prepolymers with the sulfonated phenolic compounds, in accordance with this invention, one can control the final product so as to produce a product having the desired tanning properties.

These new products impart improved properties to substrates other than leather. For example, when applied as dye assistants, improved color values and better leveling are obtained in many instances. The first and second condensation stage products also exhibit dispersing and/or solubilizing properties.

In the treatment of a substrate such as leather, generally from about 5% to about 25% by weight of my products can be utilized based on the weight of the wet shaved leather. Amounts of over 25% by weight of the treating agent can be used but generally utilizing such high amounts does not provide any increased beneficial tanning properties. Hence it is seldom necessary to utilize these products in amounts in excess of 25% by weight.

It has been found that by heating this condensation product of a urea-formaldehyde resin with a sulfonated phenolic compound at a temperature of from about 70° to 102° C. for a period of from about two to four hours after the formation of a clear solution, a third stage condensation product forms which exhibits excellent dispersing and/or solubilizing properties for water insoluble materials such as pitch formed during the paper making process, water insoluble dyes and pigments. This increase in the degree of polymerization of the condensation product causes a reduction of its usefulness as a tanning and treating agent with a subsequent increase in its dispersing and/or solubilizing properties. This product has improved dispersing and/or solubilizing properties due to the high molecular weight and size of the condensate formed during this stage of condensation. During the third condensation stage, heating can be stopped and the product cooled at any time from two to four hours after the formation of the clear solution depending upon the exact degree of polymerization desired.

If desired, the third stage condensation product can be made from the first or second stage condensation product by heating the product to a temperature of from about 70° to 102° C. and then carrying out the reaction for the desired period of time. On the other hand, the third stage polymerization product can be prepared directly by carrying out the original condensation reaction of a urea-formaldehyde polymeric resin with a sulfonated phenolic compound at a temperature of from about 70° to about 102° C. for a period of from about 2 to 4 hours after the formation of the clear solution.

In order to achieve the desired properties and characteristics of the products produced by this invention, heating of the condensate of urea-formaldehyde product with sulfonated phenolic compounds at the aforementioned acid values, at temperatures of about 70° to 102° C. should be stopped at some time up to about 4 hours after the formation of the clear solution. It has been found that if heating is continued past this period under the above conditions, the molecular weight of the polymer becomes so great that the product loses to a great extent its beneficial tanning, treating and solubilizing properties. Eventually, if heating under these conditions is carried out for too long a time, a thick gel forms which becomes difficult to solubilize or disperse in water.

Besides having the aforementioned beneficial dispersing properties, the products produced by the third condensation stage are useful as tanning agents, pretanning agents, retanning agents; and, although due to the high molecular weight of these products, they do not have the excellent penetratability in the hides or leather as do the products of the first or second condensation stages. By regulating the time and temperature of condensation of the sulfonated phenolic compound with the urea formaldehyde prepolymer during the third stage of condensation, one can control the molecular structure and size of the products produced during this stage. In this manner the final product can be regulated so that the dispersing and solubilizing properties can be increased while many of the tanning properties of the final product are simultaneously decreased.

In accordance with this invention, the molecular structure and molecular size and in turn the final properties of the product of each of the condensation stages are further dependent on the various resinous prepolymers obtained by condensing urea and formaldehyde. Hence by varying the mole ratio of formaldehyde to urea in preparing the prepolymers, the specific properties of the final condensation products produced by condensing the prepolymer with formaldehyde under the aforementioned conditions could be controlled. For example, a condensate obtained by condensing a resinous prepolymer produced by polymerizing one mole of formaldehyde and one mole of urea with an aqueous solution containing sulfonated phenol having a hydrogen ion concentration of 23.7 calculated as weight percent sulfuric acid for a period of about one-half hour after the formation of a clear solution, gave excellent grain filling properties to leather when used in a leather tanning process. This product also produced in retanned leather, tighter grain, and excellent surface feel besides providing an excellent bleach for the leather. This product showed a diminished degree of solubility in water under progressive dilution, as shown by the fact that a white sediment formed when a water mixture containing 5% by weight of this product was prepared. On the other hand, when a second product was prepared in the same manner except that the prepolymer was prepared from two moles of formaldehyde and one mole of urea and the hydrogen ion concentration was 8% by weight, a condensation product was produced that was indefinitely dilutable in water and had a greater solubility under lower acidic conditions that the first condensation product. This second condensation product, which was prepared from the prepolymer formed by condensing two moles of formaldehyde to one mole of urea, when applied to a leather in in retanning process gave better penetration into the leather and more uniform fixation in the leather than the first condensation product. The difference in the tanning properties of the two condensates was shown by the fact that the first condensation product produced greater grain tightening in leather when utilized as a retanning agent, as well as a greater filling of the leather and a higher bleach effect in the leather than the second condensation product. The excellent leather filling properties of the first condensation product is due to its low solubility under highly acidic conditions and its diminished solubility in water under progressve dilution which allows this product to settle out of solution and fill the pores or grains of the leather. These properties are not present in the second condensation product.

The use of a condensate of urea, formaldehyde and a sulfonated phenolic compound as a tanning agent, is disclosed by U.S. Patent No. 1,841,840, Muller, Jan. 19, 1932; U.S. Patent No. 2,127,068, Muller, Aug. 16, 1938; French Patent No. 1,266,511, Guthke et al. All of these patents show a condensate prepared by simultaneously reacting urea, formaldehyde and a sulfonate phenolic compound. By utilizing a precondensate of urea and formaldehyde, it has been found that a great variety of products having different chemical and physical characteristics can be produced and that the characteristics and properties of these products can be controlled through the many variations made possible by the method of this invention.

The sulfonated phenolic compound for use in reacting with the urea-formaldehyde polymeric resin can, in accordance with this invention, be any sulfonated aromatic compound containing at least one phenolic hydroxy group such as phenol sulfonic acid, cresol sulfonic acid, resorcinol sulfonic acid, naphthol sulfonic acid, etc.

In producing the products of this invention, it is essential that the urea and the formaldehyde be reacted to form a high molecular weight polymeric resin prior to reaction with the sulfonated phenolic compound so as to be able to produce condensates having predetermined tanning and dispersing and/or solubilizing properties due to the controlled conditions of the reaction. The products of this invention all impart improved filling, grain characteristics, bleach and light fastness as well as other improved tanning properties to the hide or leather to be treated, as well as provide improved dispersing or solubilizing agents for dyes, pigments, pitch formed during the paper making process, etc. In the treatment of a substrate such as leather from about 5% to about 25% of this product is utilized based upon the weight of wet shaved leather. The products of this invention are applied to leather in the form of an aqueous solution.

It is essential in order to obtain the desired substantially water insoluble resinous prepolymer, to subsequently produce the products of this invention, that the reaction of the formaldehyde and urea be carried out at a pH of below 4, preferably from 3.2 to 3.8 for a period of time sufficient to form a slurry or precipitate. The reaction of the urea and formaldehyde under acid conditions is exothermic and can be carried out, in accordance with this invention, without supplying any external heat. Due to the fact that this reaction may by slow in starting, it is generally preferred to heat the urea and formaldehyde to a temperature of from 40° to 60° C. and then allow the exothermic reaction to set in. The temperature during this reaction should be maintained at 75° C. to 100° C. Furthermore, in the production of polymeric resinous urea-formaldehyde reaction products, sufficient quantities of reactants should be used to provide the reaction mixture with a ratio of from about 1 to 4 moles of formaldehyde for each mole of urea employed. Under these conditions, high molecular weight polymers are formed which appear as which precipitates or slurries.

The improved products of this invention are readily prepared from these preformed substantially water insoluble resinous prepolymers. For example, this is accomplished by adding these resinous prepolymers to a sulfonated phenolic component. The sulfonated phenolic component may consist only of the sulfonated phenolic compound or it may be composed of a water solution of the sulfonated phenolic compound. In some cases, the sulfonated phenolic component should contain a neutralizing agent such as the primary amines or strong alkalis which include sodium hydroxide potassium hydroxide, ammonium hydroxide, ammonia, etc. and a proper amount of water to adjust the hydrogen ion concentration of the sulfonated phenolic component to from about 8% to 24%, calculated as weight percent sulfuric acid, based on the total weight of the sulfonated phenolic component. In cases where the sulfonated phenolic component is already at that aforementioned hydrogen ion concentration, it is not necessary to add the neutralizing agent. But generally the hydrogen ion concentration of the sulfonated phenolic component is too high due to the fact that residual sulfuric acid is present from the sulfonation reaction of the phenolic compound under acidic conditions, and water and neutralizing agent must be added to adjust the sulfonated phenolic component to the proper concentration and acidity before reacting with the prepolymer. The neutralizing agent may be added to the reaction medium after the prepolymer and the sulfonated phenolic component have been mixed together and before reaction, to adjust the reaction medium to the aforementioned hydrogen ion concentration. Also the prepolymer itself may contain sufficient neutralizing agent so that when it is mixed with the sulfonated phenolic component, it will lower the hydrogen ion concentration of the mixture to the proper level. But generally for better control it is better to adjust the hydrogen ion concentration, before the addition of the prepolymer to the sulfonated component by incorporating the neutralizing agent in the sulfonated phenolic component.

After adjusting the proper acid level, the mixture of the sulfonated phenolic component and the resinous prepolymer is heated to a temperature of from about 80° to 102° C., preferably from 80° to 100° C. These conditions are maintained for at least a period of time sufficient to convert the white slurry or precipitate into a clear solution which indicates that the initial condensation reaction is complete. Generally at temperatures of from 83° to 95° C. condensation runs smoothly and the first condensation reaction proceeds in about 15 to 30 minutes.

By carrying out the condensation reaction of the sulfonated phenolic compound at a hydrogen ion concentration of 8% to 24%, calculated as weight percent of sulfuric acid based on the total weight of the aqueous solution containing the sulfonated phenolic compound, the resinous prepolymer which is in the form of a white slurry is activated so that it can condense with the sulfonated phenolic compound to form the water soluble condensates of this invention. It has been found that during the reaction of the various resinous prepolymers produced by varying the molar ratios of formaldehyde and urea with the sulfonated phenolic compound, the hydrogen ion concentration is of prime importance in activating the prepolymer so that it can react with the sulfonated phenolic compound to form a condensate. This is shown by the fact, that it has been observed that by utilizing resinous prepolymers made by polymerizing about one mole of formaldehyde with one mole of urea, a higher hydrogen ion concentration was required to activate this prepolymer than in cases where a prepolymer was formed utilizing higher molar proportions of formaldehyde per mole of urea. In the former case, a hydrogen ion concentration of from about 12% to 24%, calculated as weight percent sulfuric acid based on the total weight of the aqueous solution, is required to activate the prepolymer so that it can react with the sulfonated phenolic compound to form a condensate in accordance with this invention.

The polymeric condensates of the urea formaldeyhde polymeric resin and the sulfonated phenolic compound may be applied by means of an aqueous bath, alone or in conjunction with other tanning agents, to leather. These condensates are adsorbed and absorbed by the leather from the aqueous bath under acidic conditions or under neutral conditions whereby they react with the hide to impart the aforementioned beneficial tanning properties to the leather. Hence the condensates of this invention can be applied to leather or hides in their neutralized or acidic states.

The polymerization condensates of this invention also aid in the subsequent fat liquoring operations. However, when emulsions of sulfonated oils are utilized in the fat liquoring operations, the high molecular weight of the tanning agent of this invention inhibits to some extent the progressive penetration and fixation of these fat liquoring agents within the hides by breaking these emulsions. In accordance with another embodiment of this invention, I have found that by modifying the condensate of a urea-formaldehyde resin with a sulfonated phenolic compound, by adding from about 0.1 to 0.3 mole of urea for every mole of the sulfonated phenol compound after the reaction between these urea-formaldehyde resins and the sulfonated phenol has reached the first stage of condensation, as indicated by the formation of a clear solution, and heating to a temperature of from 70° to 100° C. preferably from 80° to 85° C., for about one half to three hours, a lower molecular weight tanning agent will be produced which will not subsequently break the emulsions of the sulfonated fatty oil type fat liquoring agents. These modified condensation products have all the excellent tanning properties and treating properties of the higher molecular weight condensates. Hence these modified condensates can be used as pretanning agents, retanning agents, tanning agents and auxilliary tanning agents for preparing improved leather products in the same manner of the higher molecular weight condensates of this invention.

The phenomenon whereby a lower molecular weight condensate of a urea-formaldehyde resin with a sulfonated phenolic compound is produced when additional urea is added to the reaction mixture of the sulfonated phenolic compound just after this first stage of condensation has been completed, as indicated by the formation of a clear solution, is not completely understood, however, it is believed that these results are attributable to the fact that the urea provides a stabilizing or blocking effect and prevents further build-up of the condensate. The reaction of the urea with the condensate is carried out by heating to temperatures of from about 70° to 100° C., preferably from about 70° to 85° C. I have found that temperatures above 100° C. promote many side reactions, which produce a poor final product. The temperature of this reaction should be maintained for a period of from about one half hour to about three hours, preferably about two hours, depending upon the desired product.

The modified condensate of this invention greatly enhances the fat liquoring operations especially when sulfated oil systems are utilized as fat liquoring agents. Treating leather with fat liquoring agents such as fatty oils-oil systems are old and well known in the leather tanning art. Typical sulfated fatty oils which may be used in conjunction with their fatty oils to treat leather in conjunction with the consensates of this invention include sulfated neat's-foot oil, sulfated rice bran oil, sulfated sperm oil, sulfated fish oil, sulfated cod oil, sulfated moellon oil, sulfated vegetable oil, sulfated mineral oil, sulfated castor oil, etc. These oils systems generally have an $SO_3$ content ranging from 2 to 10% by weight of the oil system. Other sulfated oils which utilized in the fat liquoring process of hide and skins are disclosed in U.S. Patent No. 2,630,408, Lighthipe et al., Mar. 3, 1953.

These oils systems are applied to the leather to be treated in water after the leather usually has been tanned. In the fat liquoring process where sulfated oils-oil systems are used, generally from about 2% to 25% by weight of these oil systems are utilized based upon the weight of the tanned leather. Usually enough water is added to the system so that the weight of the water is at least equal to the weight of the tanned leather to be treated by the fat liquoring agent.

The products of this invention impart improved properties to substrates other than leather. For example, when applied as dye assistants, improved color values and better leveling are obtained. These products can be utilized as pigment dispersants and as pitch dispersants.

Another advantage of these products are that they can be used in conjunction with substantially water insoluble nonionic lubricants for leather which are hereinafter described, to solubilize this lubricant in water. Another advantage of utilizing these lubricants in conjunction with the condensates of this invention in the tanning of leather is that this mixture provides, particularly with chrome tanned leather, improved filling and softening, increased light fastness and dense fiber structure.

The lubricants which can be solubilized by means of the products of this invention and which, in conjunction with the products of this invention provide to leather the improved treating properties, are selected from the group consisting of compounds having the following formula:

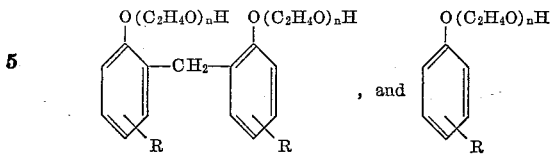

in which R is a straight or branched chain carbocylic or alkyl substituent having from about 5 to 12 carbon atoms $n$ is a number from about 1 to 9 and the total number of carbon atoms in the R substituent is at least equal to the number $n$. Typical examples of such compounds include bis-(p-tertiary octyl phenol condensed with three moles of ethylene oxide) methane, bis-(p-tertiary octyl phenol condensed with 6 moles of ethylene oxide) methane, bis-(p-nonyl phenol condensed with 9 moles of ethylene oxide) and bis-(p-n-pentyl phenol condensed with 5 moles of ethylene oxide) methane.

In the above formula, it is necessary that the total number of carbon atoms in the R substituent be at least equal to the total number of ethylene oxide units condensed on the ring which is designated by the letter $n$. A bisphenol condensate is produced which can be either substantially water insoluble or substantially water dispersible due to the balance of the hydrophilic ethylene oxide with the hydrophobic alkylene groups. These bisphenol compounds are old and well known. Typical methods of preparing ethylene oxide condensates of alkyl bisphenols are disclosed in S.N. 753,606, Liebling et al., filed Aug. 7, 1958, now U.S. 3,064,057, Liebling et al., Nov. 13, 1962 and U.S. 2,499,363, De Groote et al., Mar. 7, 1950. These methods can be utilized to prepare the ethylene oxide bisphenol or phenol compounds designated above which are utilized in conjunction with the products of this invention.

By utilizing the anionic condensates of this invention as solubilizing agents, these substantially water insoluble nonionic lubricants can be applied to leather in the form of water solutions. In this manner, these nonionic lubricants will be retained on the leather due to their substantial insolubility in water whereas the anionic tanning agent of this invention will be also permanently fixed on the leather by means of reacting with the leather. In preparing a water soluble mixture of the aforementioned lubricant and the condensate of this invention, the lubricating agent should constitute from about 1 to about 60% by weight of the total mixture so as to impart the aforementioned beneficial properties to the leather. In the treatment of leather with the above mixture, from about 5% to about 25% by weight of this mixture of the anionic condensate of this invention and the nonionic lubricant are utilized, based on the weight of the wet shaved leather.

In accordance with another embodiment of this invention, I have found that if the resinous prepolymer is prepared by utilizing in excess of 2 moles of formaldehyde for each mole of urea, that is from above 2 moles to about 4 moles of formaldehyde per mole of urea, preferably from about 4 moles of formaldehyde per mole of urea, a condensation product is produced in any of the three condensation stages which contains active methylol groups which can further condense with amino compounds containing at least one active hydrogen atom connected to the nitrogen atom or cationic aminoplast resins to produce amphoteric tanning agents. These amino compounds and cationic aminoplast resins can be characterized as nitrogen containing compounds which, by reaction between the hydrogen of the amine with the hydroxyl group of the anionic condensate, condense to produce amphoteric condensates. These amphoteric materials are useful in tanning, retanning and pretanning operations. They are especially useful in a pretanning operation when vegetable extracts are subsequently used as tanning agents to produce a full vegetable tanned leather. These amphoteric condensates allow penetration of vegetable extracts into the leather quickly and easily.

The cationic aminoplast resins are prepared by interreacting or condensing an amino resin base with an aldehyde, preferably formaldehyde or a compound which liberates formaldehyde, such as paraformaldehyde, trioxane and hexamethylenetetramine to form free methylol groups and then condensing or interreacting this product with a amino resin base in order to block off the free or active methylol groups, in the manner described in U.S. Patent No. 2,944,046, Sellet. The amino resin bases can be characterized as low molecular weight nitrogen containing compounds which by reaction between the hydrogen of amine with aldehyde, form methylol derivatives in monomeric or polymeric form.

Examples of amino resin bases which are condensed with the formaldehyde include dicyandiamide, guanidine, guanylurea, urea, thiourea, biuret, melamine, ammeline, ammelide, cyanuric acid, guanamines as well as their mixtures and derivatives. The cationic aminoplast resins obtained above are generally characterized as cationic to various degrees, as water soluble or water dispersible and preferably should have a long and unlimited shelf life, i.e., should not undergo physical or chemical change upon standing for long periods of time. Exemplary of these cationic aminoplast resins which can be reacted with the reactive methylol groupings directly linked to the nitrogen within the condensates of this invention, are those described in British Patent No. 777,827, June 26, 1957 and in U.S. Patent No. 2,944,046, Sellet, July 3, 1960.

The cationic aminoplast resins are characterized by their excellent shelf life and stability. This results from the elimination of free methylol groups of the resin by reaction with amino resin bases such as those given above. Other useful cationic aminoplast resins are those set forth in U.S. Patent No. 2,567,238, Sellet et al., Sept. 11, 1951; 2,690,434, Sellet et al. Sept. 28, 1954; 2,847,396, Sellet, Aug. 12, 1958, i.e., the resins prepared in column 1, line 71 to column 2, line 15 and claim 5, and 2,852,490, Sellet et al., Sept. 16, 1958. The degree of cationic activity in the aminoplast resin is shown by interreaction with anionic materials and is related to the degree of polymerization and molecular size. Aminoplast resins which are strongly cationic in nature are the higher molecular weight resins having a high degree of polymerization. Aminoplast resins having a lesser degree of cationic activity have lower molecular weights resulting from a lower degree of polymerization. Also, the presence of carbamide groups tends to reduce the degree of cationic activity.

Examples of amino compounds containing an active hydrogen atom connected to the nitrogen atoms which can be reacted with the anionic condensates of this invention to produce the amphoteric resins include dicyandiamide, guanidine, guanylurea, urea, thiourea, biuret, melamine, ammeline, ammelide, cyanuric acid, guanamines, ethylene diamine, etc.

With regard to the preparation of the amphoteric condensate which can be applied to leather substrates, the following is set forth.

Cationic aminoplast resins or amino compounds can be condensed with the anionic condensates of this invention which have free methylol groups available for reaction with the reactive hydrogen of the cationic aminoplast resin or the amino compound. This can be accomplished by condensing from about .02 to 2 moles of the cationic aminoplast resin or the amino compound with one mole, based on the moles of urea utilized in formulating the prepolymer, of the anionic condensate of this reaction. An excess of the cationic aminoplast resin or amino compound (three moles) may be mixed with the anionic condensate of this invention and carried in neutral form in the cationic product. The reaction between the amino compound or the cationic aminoplast resin and the anionic condensate of this invention is preferably carried out at temperatures of from about 50° C. to 100° C. Also the time of the reaction will vary in different cases, the time being usually in the range of about 1 to 3 hours. As well known, the time may be decreased by increasing the temperature and vice versa. Generally heating for over 3 hours produces no further condensation. The pH of the reaction medium is preferably neutral although it may be very slightly acid or very slightly alkaline, i.e., from pH's of from about 6.5 to 7.9.

The amphoteric condensates may be further reacted with formaldehyde if desired, preferably from about 1 to 4 moles of formaldehyde, so as to introduce complementary methylol groups in the amphoteric condensates which promotes further polymerization and complexing with metal salts. This is especially advantageous when an amino compound is used.

These new amphoteric condensates are specifically improved auxiliary tanning agents, tanning agent, pretainning agents, retanning agents and may be used in treating leather in the same manner as the anionic condensates. The multi-charged characteristics of these amphoteric condensates provide a quick and uniform penetration of the rawhide and leather. A pretanning operation thus performed not only enables quick penetration of the amphoteric condensate into the hide or leather but also enables a rapid penetration into the leather or hide of metal salts and other tanning agents in subsequent operations. This rapid penetration produces a more even distribution of the metal salts and other tanning agents within the leather or hide. By such operations a full and tight leather is produced.

In the treatment of a substrate such as leather from about 5% to about 25% of any amphoteric product can be utilized based on the weight of wet shaved leather. These amphoteric products can be applied to leather by means of an aqueous solution under acidic or neutral conditions.

By the term formaldehyde as used in the specification and claims, I mean any compound capable of liberating formaldehyde such as paraformaldehyde, trioxane, etc. While formalin, which is an approximately 37% by weight aqueous solution of formaldehyde is preferably employed, formaldehyde in any of its polymeric forms, as, for example, paraformaldehyde, trioxane, etc., can be used.

For a fuller understanding of the present invention, reference is made to the following examples which are given for the purposes of illustration only and are not to be construed in a limiting sense.

*Example I*

The following example is directed to the preparation of a tanning agent utilizing phenol sulfonic acid, urea and formaldehyde.

244.5 pounds (3.0 moles) of 37% by weight of water solution of formaldehyde, 90 pounds of urea (1.5 moles) and 1 pound of formic acid were added under constant stirring to a kettle. The resultant mixture was heated in the kettle to 100° C. said temperature maintained until the formation of a white slurry which indicated the formation of a urea formaldehyde polymeric resin. The mixture was cooled to 75° C. and a mixture of 348 pounds of phenol sulfonic acid, said mixture having a total acid value of 26.5 to 27.8% calculated as weight percent sulfuric acid based on the weight of the pure phenol sulfonic acid, and 100 pounds of water were added to the kettle. Upon the addition of the water and the phenol sulfonic acid, an exothermic reaction took place wherein the temperature rose from 75° to 103° C. As soon as this temperature was reached, the reaction mixture was cooled back to 75° C. and another 100 pounds of water was added. The temperature of the reaction was maintained at 70° C. until the formation of clear solution which indicated a condensation product of the sulfonated phenol with the urea-formaldehyde condensate had been produced. After the formation of a clear solution, heating was stopped and another 100 pounds of cold water were added to the product dropping the temperature to 35° C. The product was neutralized by adding 158 pounds of ammonia. The pH of the neutralized solution was 7.5.

*Example II*

This example is directed to a mixture of a condensate of a urea-formaldehyde resin with phenol sulfonic acid and para octyl bisphenol condensed with six moles of ethylene oxide per hydroxy group.

To the neutralized and cooled product of Example I, there was added under stirring 46.4 pounds of the sodium salt of hydroxy sulfo methane and 25 pounds of water. This mixture was slightly heated to a temperature of 40° C. After stirring for 20 minutes at this temperature, 120 pounds of bis(para-octyl-phenol condensed with six moles of ethylene oxide)methane was added to the mixture. The ethylene oxide condensate and the mixture were stirred for 15 minutes at this temperature. This mixture was a clear solution. After stirring for this period, 10 pounds of hydroxy acetic acid was added so as to reduce the pH of the resulting mixture to about 3.5. The resulting mixture was a light straw colored clear liquid.

*Example III*

This example is directed to the formation of a tanning agent by condensing sulfonated o-cresol with a urea-formaldehyde polymeric resin.

244.5 pounds (3 moles) of 37% by weight water solution of formaldehyde, 90 pounds (1.5 mole) of urea and 1 pound of formic acid were added under constant stirring to a kettle. The mixture was then heated to 60° C. As soon as this temperature was reached, an exothermic reaction set in and the temperature of the mixture rose to 100° C. This temperature was maintained until the formation of a white slurry which indicated that a urea-formaldehyde polymeric resin formed. After the formation of the white slurry, heating was stopped and the reaction was allowed to cool to 80° C. A mixture consisting of 576 pounds of ortho-cresol sulfonic acid, 100 pounds of water and 166 pounds of 30° Bé. caustic soda were added under stirring to the slurry while the slurry was maintained at a temperature of 80° C. This mixture had a total acidity of 27.5%, calculated as weight percent sulfuric acid based on the weight of the pure o-cresol sulfonate. After this addition, the temperature of the reaction media rose to 85° C. without heat being applied due to the exothermic reaction. After this period, the temperature of the reaction media fell to 72° C. and this temperature was maintained by slight heating until the formation of a clear reaction solution which indicated that the condensation product of the urea formaldehyde resin with cresol sulfonic acid had formed. After the formation of a clear solution, the condensation product was neutralized with the additional 222 pounds of 40° Bé. sodium hydroxide and cooled to about 35° C. by the addition of 200 pounds of cold tap water. Enough 40° Bé. sodium hydroxide was added so as to regulate the pH of the clear solution to about 7.5.

*Example IV*

This example is directed to the urea modified condensate product of ortho-cresol sulfonic acid condensed with a urea-formaldehyde resinous polymer.

To the clear solution of the neutralized product of Example III there was added 30 lbs. of urea, said product being at a temperature of 70° C. After the addition of the urea, the temperature was raised to about 85° C. by means of heating. This temperature was maintained for a period of two hours. After this period, the product which was a clear solution was neutralized and cooled to 30° C. by the additiih of 200 pounds of cold tap water and 222 pounds of 30° Bé. caustic soda. The pH of the resultant solution was about 7.2.

*Example V*

The following example is directed to the preparation of a tanning agent produced by condensing ortho cresol sulfonic acid with a urea formaldehyde condensate formed by utilizing a mole ratio of formaldehyde to urea of 1 to 1.

81.5 pounds of 37% by weight of a water solution of formaldehyde, 60 pounds of urea and one pound of 90% by weight of a water solution of formic acid were added, under constant stirring, to a kettle. The resultant mixture was heated in the kettle to 60° C. As soon as this temperature was reached, an exothermic reaction took place raising the temperature to about 80° C. This temperature was maintained while the mixture formed a white slurry which indicated that polymerization was complete. After the formation of a white slurry, the kettle was cooled to 80° C. and a mixture consisting of 376 pounds of ortho cresol sulfonic acid and 50 pounds of water were added to the kettle. After the addition of water and ortho cresol sulfonate to the kettle, the contents were heated to a temperature of from 80 to 85° C. After about 5 minutes a clear solution formed indicating that a condensation product of the sulfonated cresol with urea-formaldehyde polymer had been produced. This clear solution was further heated to a temperature of about 83° C. for a period of 30 minutes. After this period, the reaction product was cooled to 35° C. and this product was then neutralized by adding 385 pounds of 30° Bé. sodium hydroxide. The pH of the neutralized solution was 7.5%.

*Example VI*

The following example is directed to the preparation of a tanning agent produced by condensing ortho cresol sulfonic acid with a urea formaldehyde condensate formed by utilizing a mole ratio of formaldehyde to urea of 4 to 1.

326 pounds of 37% by weight of a water solution of formaldehyde, 60 pounds of urea and one pound of 90% by weight of a water solution of formic acid were added under constant stirring to a kettle. The resultant mixture was heated in the kettle to 60° C. As soon as this temperature was reached, an exothermic reaction took place raising the temperature to about 87° C. This temperature was maintained until the mixture formed a white slurry which indicated that the polymerization was complete. After the formation of a white slurry, the mixture was cooled to 80° C. and a mixture consisting of 376 pounds of ortho cresol sulfonic acid, 100 pounds of water and 166 pounds of 30° Bé. sodium hydroxide were added to the kettle. After the addition of this mixture to the kettle, the contents were heated to a temperature of from 80° to 85° C. After about 5 minutes, a clear solution formed indicating that the condensation product of the sulfonated cresol with urea-formaldehyde polymer had been produced. This clear solution was further heated to a temperature of about 83° C. for a period of 2 hours. After this period, the reaction product was cooled to 35° C. This product was then neutralized by adding caustic soda until the pH of the solution was 7.5%.

*Example VII*

This example is directed to the preparation of an amphoteric condensate.

306 pounds of the solution produced in accordance with Example VI was introduced into a reaction kettle equipped with a jacket, stirrer, and a reflux condenser. This product was then heated to a temperature of about 83° C. whereupon 168 pounds of dicyandiamide were then introduced into the kettle, under constant stirring. After a period of one hour, 326 pounds of 37% by weight of a water solution of formaldehyde were introduced into the kettle, while maintaining the temperature at about 83° C. After all of the 326 pounds of formaldehyde were introduced into the kettle, the temperature of the kettle was raised to 95° C. Heating was continued at this temperature for a period of 4 hours. After this period, heating was stopped and the solution containing the amphoteric condensate was cooled to room temperature.

*Example VIII*

The following example is directed to the preparation of an amphoteric tanning agent.

A. *Preparation of the anionic condensate.*—244.5 pounds of 37% by weight of a water solution of formaldehyde, 90 pounds of urea, and 1 pound of 90% by weight of a water solution of formic acid were added under constant stirring to a kettle. The resultant mixture was heated in the kettle to 60° C. As soon as this temperature was reached, an exothermic reaction took place, raising the temperature to about 87° C. This temperature was maintained until the mixture formed a white slurry which indicated that polymerization was complete. After the formation of a white slurry, the kettle was cooled to 80° C. and a mixture consisting of 166 pounds of 30° Bé. caustic soda, 376 pounds of ortho cresol sulfonic acid and 100 pounds of water were added to the kettle. After the addition of water and ortho cresol sulfonic acid to the kettle, the contents were heated to a temperature of from 80° to 85° C. After about 5 minutes, a clear solution formed which indicated that a condensation product of the sulfonated cresol with the urea formaldehyde polymer had been produced. To this clear solution containing the condensate, 30 pounds of urea were added. This urea and the condensate were further heated at a temperature of about 83° C. for a period of 2 hours. After this period, the reaction product was cooled to 35° C. and this product was then neutralized by adding 166 pounds of 30° Bé. caustic soda.

B. *Formation of amphoteric condensate.*—A reaction product was prepared by adding the following ingredients to a reaction vessel and heating at a temperature of about 100° C. until a clear solution formed.

95.05 pounds of a lignosulfonate solution of about 50% solids (extraction product from the purification of cellulose in the manufacture of paper pulp containing lignin and other natural organic materials which are sulfonated)
15.78 pounds of water
13.3 pounds of dicyandiamide.

To this clear solution there were added 25.86 pounds of 37% by weight of a water solution of formaldehyde. The formaldehyde and the clear solution were heated together for one hour at about 85° C. so as to form a cationic aminoplast resin. This cationic aminoplast resin was added to the solution containing the urea modified anionic condensate. Upon addition of this cationic resin, the mixture was heated to a temperature of 85° C. for a period of about 1 hour so as to condense the cationic resin with the anionic condensate to form the amphoteric condensate. After this period, the solution containing the amphoteric resin was then cooled to room temperature. The cooled product was partially neutralized by adding 172 pounds of 30° Bé. sodium hydroxide. The pH of the partially neutralized solution was 4.0. To the partially neutralized solution, 40 pounds of 70% by weight of a water solution of hydroxy acetic acid were added to reduce the pH to 2.8.

*Example IX*

This example is directed to the preparation of an amphoteric tanning agent.

1310 pounds of the condensate produced in accordance with Example VI and 289 pounds of aminoplast resin produced in accordance with Example XII of the United States Patent No. 2,944,046 were introduced into a reaction vessel under contant stirring. This mixture was heated to a temperature of 75 to 85° C. This temperature was maintained for a period of one hour whereupon all of the anionic condensate reacted with the aminoplast resin forming the amphoteric resin. The solution containing the amphoteric resin was then cooled to room temperature.

*Example X*

This example is directed to the preparation of an amphoteric tanning agent.

1310 pounds of the condensate solution produced in accordance with Example VI and 530 pounds of aminoplast resin produced in accordance with Example 15 of United States Patent No. 2,944,046 were introduced into a reaction vessel under constant stirring. This mixture was heated to a temperature of about 80° C. This temperature was maintained for a period of one hour whereupon all of the anionic condensate reacted with the aminoplast resin forming the amphoteric resin. The solution containing the amphoteric resin was then cooled to room temperature.

*Example XI*

This example is directed to the preparation of an amphoteric tanning agent. 1310 pounds of the condensate solution produced in accordance with Example VI and 265 pounds of the aminoplast resin produced in accordance with Example 15 of the United States Patent No. 2,944,046 were introduced into a reaction vessel under constant stirring. This mixture was heated to a temperature of about 80° C. This temperature was maintained for a period of one hour whereupon all of the anionic condensate reacted with the aminoplast resin forming the amphoteric resin. The solution containing the amphoteric resin was then cooled to room temperature.

*Example XII*

This example illustrates a typical retanning procedure for chrome pretanned skins or hides, using the products of Examples I through VII and IX through XI as retanning agents.

Each of the products of Examples I through VII and IX through XI were applied to leather which was treated in the following manner.

100 pounds of chrome pretanned side leather which has been wrung, split, and shaved to weight was placed into a drum. The hides were neutralized in the drum to a pH of approximately about 4.0 by adding sodium bicarbonate. The hides were subsequently washed at temperature of 110° F. with water for approximately fifteen minutes to remove shavings, salts, and residual surface acidity. After washing was completed, the hides were then floated in a drum by adding approximately 100 pounds of water at 120° F.

Each of the products of Examples I through VII and IX through XI were applied to the leather hides in the following manner:

Approximately 12 pounds of one of the tanning solutions prepared in accordance with Examples I through VII and IX through XI were added to the drum. The floated hides were treated with the tanning solutions for a period of about 60 minutes. After this period, the drum was drained. After treatment with the tanning solution, the leather was then prepared for fat liquoring. This was accomplished by washing the hides with water for approximately 10 minutes at about 125° F. After washing, the stock was floated by adding approximately 100 pounds of water at a temperature of about 125° F. to the drum. After the flotation, fat liquoring was carried out by adding about 8 pounds of a sulfated sperm oil having a free oil content of about 45% by weight, an acid value of 41 to 50 based on the weight of the free oil, and about 8 pounds of water to the drum. After 43 minutes, the drum was drained.

The leather produced by the above procedure was full and mellow having a tight grain. The leather was bleached white and had good resistance to discoloration upon exposure to light.

The solutions drained from the drum after the fat liquoring and tanning procedures in each case were cloudy except in the case when the condensate of Example IV was utilized. In the case of the condensate of Example IV the solution, obtained after the retanning and the fat liquoring operations, was completely clear. This indicated that there was complete adsorption and absorption of the condensates of Example IV as well as the fat liquor by the hide so as to yield clear solution. This illustrates that by modifying the condensates in the manner of Example IV, better penetration of the tanning agent into the hide and fat liquoring of the pretanned hide was accomplished.

*Example XIII*

This example illustrates the application of the mixture of Example II and the condensate of Example VII as pretanning agents used prior to the application of basic chromium salts to skins or hides. Each of the products of Examples II and VII were applied to leather which was treated in the following manner:

Approximately 100 pounds of drained pickled cowhide which was lime split, baited, pickled, and drained was placed in a drum which contained 200 pounds of water, at a temperature of approximataely 80° F. and 10 pounds of sodium chloride.

Each of the products of Examples II and VII were applied to the cowhide in the following manner:

Approximately 10 pounds of one of the tanning solutions prepared in accordance with Examples II or VII were added to the drum containing the cowhide and the cowhide was treated with the tanning solution for a period of about 1.5 hours. After this period, 8 pounds of basic chromium sulfate (Tanolin R) dissolved in 3 gallons of water was added to the drum. This basic chromium salt solution was added to the drum in two feeds, 30 minutes apart. When all of the basic chromium salt was added to the drum, the cowhide was drummed in the basic chromium salt solution for a period of 5 hours. After this period, the drum was rotated for an additional hour. After rotation, the resulting leather was neutralized with sufficient sodium bicarbonate to produce a pH of approximately 4. After the pH was adjusted, the drum was drained. The leather was then fat liquored by means of the procedure described in Example XII.

The leather which was produced by utilizing the mixture of Example II as a pretanning agent before the application of the basic chromium salt had a better over-all tightening of the fiber structure, a fuller, rounder and softer feel, and enhanced light fastness than the leather produced by utilizing the condensation product described in Example VII as a pretanning agent before the application of basic chromium salt. On the other hand, there is a quicker and more complete penetration of the tanning agent into the leather which is produced by utilizing the condensation product of Example VII as a pretanning agent. The leather produced by utilizing the condensation product of Example VII had an increased over-all tensile strength over the leather produced by utilizing the product of Example II as a pretanning agent.

*Example XIV*

This example illustrates the application of a condensate described in Example VIII in replacing vegetable extracts in the retannage of chromium pretanned hides or skins.

100 pounds of chromium pretanned leather which has been wrung, split, and shaved to weight were placed in a drum. The hides were neutralized in the drum to a pH of approximately 4.5 by adding sodium bicarbonate. The hides were subsequently washed with water at about 80 to 85° F. for approximately 50 minutes to remove shavings, salts, and residual surface acidity. After washing was completed, the hides were then floated in the drum by adding approximately 100 pounds of water. 40 pounds of the tanning solution prepared in accordance with Example VIII was diluted with sufficient water so that the volume of the tanning agent and the water was equal to 50 pounds of water. This mixture was added to the drum containing the neutralized, washed and chromed pretanned hides. The floated hides were treated with the tanning solution for a period of about 60 minutes to insure practical and economical exhaustion of the tanning agent onto the hides. After treatment with the tanning solution, the leather was then prepared for fat liquor. This was accomplished in the manner described by Example XII. The leather obtained by the above procedure had a tight grain, a solidity in the bellies and flanks within the leather as well as the increased fullness. The leather retanned in the manner of these examples resembled in every way leather retanned with vegetable extracts.

Having described my invention what I claim as new and desire to secure by Letters Patent is:

1. An aqueous composition of a water soluble composition which is the condensation product produced by reacting in an aqueous medium at a temperature of from about 70° to 102° C., a mixture comprising
   (a) a substantially water insoluble resinous prepolymer formed by reacting from about 1 to 4 moles of formaldehyde with one mole of urea, said reaction being carried out at a pH of below 4, and
   (b) a sulfonated phenolic component containing from about 0.7 to 2 moles of at least one sulfonated phenolic compound selected from the group consisting of phenol sulfonic acid, cresol sulfonic acid, xylenol sulfonic acid, resorcinol sulfonic acid and naphthol sulfonic acid per mole of urea used in formulating said prepolymer,
said mixture having a hydrogen ion concentration of from about 8% to 24%, calculated as weight percent sulfuric acid based on the weight of said sulfonated phenolic component with the proviso that when said prepolymer is formed using one mole of formaldehyde per mole of urea, the hydrogen ion concentration of said mixture is from about 12% to 24% based upon the weight of said sulfonated phenolic component, carrying out said reaction by maintaining the temperature of said mixture at from about 70° to 102° C. until the formation of a clear solution and thereafter continually maintaining the temperature of said clear solution at from about 70° to 102° C. by heating for a period of from about 0 to 4 hours.

2. The composition of claim 1 wherein said sulfonated phenolic compound is phenol sulfonic acid.

3. The composition of claim 1 wherein said sulfonated pheonlic compound is o-cresol sulfonic acid.

4. An aqueous composition of a water soluble condensate which is the condensation product produced by reacting in an aqueous medium at a temperature of from about 70° to 102° C., a mixture comprising
   (a) a substantially water insoluble resinous prepolymer formed by reacting from about 1 to 4 moles of formaldehyde with one mole of urea, said reaction being carried out at a pH of below 4, and
   (b) a sulfonated phenolic component containing from about 0.7 to 2 moles of at least one sulfonated phenolic compound selected from the group consisting of phenol sulfonic acid, cresol sulfonic acid, xylenol sulfonic acid, resorcinol sulfonic acid and naphthol sulfonic acid per mole of urea used in formulating said prepolymer,
said mixture having a hydrogen ion concentration of from about 8% to 24%, calculated as weight percent sulfuric acid based on the weight of said sulfonated phenolic component with the proviso that when said prepolymer is formed using one mole of formaldehyde per mole of urea, the hydrogen ion concentration of said mixture is from about 12% to 24% based upon the weight of said sulfonated phenolic component, carrying out said reaction by maintaining the temperature of said mixture at from about 70° to 102° C. until the formation of a clear solution and thereafter continually maintaining the temperature of said clear solution at from about 70° to 102° C. by heating for a period of from 0 to 2 hours after the formation of said clear solution.

5. The composition of claim 4 wherein said sulfonated phenolic compound is phenol sulfonic acid.

6. The composition of claim 4 wherein said sulfonated phenolic compound is o-cresol sulfonic acid.

7. An aqueous composition of a water soluble condensate which is the condensation product produced by reacting in an aqueous medium at a temperature of from about 70° to 102° C., a mixture comprising
(a) a substantially water insoluble resinous prepolymer formed by reacting from about 1.5 to 4 moles of formaldehyde with one mole of urea, said reaction carried out at a pH of below 4, and
(b) an aqueous solution containing from about 0.7 to about 2 moles of at least one sulfonated phenolic compound selected from the group consisting of phenol sulfonic acid, cresol sulfonic acid, xylenol sulfonic acid, resorcinol sulfonic acid and naphthol sulfonic acid per mole of urea used in formulating said prepolymer,
said mixture having a hydrogen ion concentration of from about 8% to 24%, calculated as weight percent sulfuric acid based on the weight of said aqueous solution with the proviso that when said prepolymer is formed using one mole of formaldehyde per mole of urea, the hydrogen ion concentration of said mixture is from about 12% to 24% based upon the weight of said aqueous solution, carrying out said reaction by maintaining the temperature of said mixture at from about 70° to 102° C. until the formation of a clear solution and thereafter continually maintaining the temperature of said clear solution at from 70° to 120° C. by heating for a period of from about 2 to 4 hours after the formation of said clear solution.

8. The composition of claim 7 wherein said sulfonated phenolic compound is phenol sulfonic acid.

9. The composition of claim 7 wherein said sulfonated phenolic compound is o-cresol sulfonic acid.

10. An aqueous composition of a water soluble condensate which is the condensation product produced by reacting in an aqueous medium at a temperature of from about 70° to 102° C., a mixture comprising
(a) a substantially water insoluble resinous prepolymer formed by reacting from about 1.5 to 4 moles of formaldehyde with one mole of urea, said reaction being carried out at a pH of below 4, and
(b) a sulfonated phenolic component containing from about 0.7 to 2 moles of at least one sulfonated phenolic compound selected from the group consisting of phenol sulfonic acid, cresol sulfonic acid, xylenol sulfonic acid, resorcinol sulfonic acid and naphthol sulfonic acid per mole of urea used in formulating said prepolymer,
said mixture having a hydrogen ion concentration of from about 8% to 24%, calculated as weight percent sulfuric acid based on the weight of said sulfonated phenolic component, with the proviso that when said prepolymer is formed using one mole of formaldehyde per mole of urea, the hydrogen ion concentration of said mixture is from about 12% to 24% based upon the weight of said sulfonated phenolic component, carrying out said reaction by maintaining the temperature of said mixture at from about 70° to 102° C. until the formation of a clear solution, adding from about 0.1 to 0.3 mole of urea per mole of said sulfonated phenolic compound to said clear solution while maintaining the temperature at from about 70° to 100° C., and thereafter continuing said reaction for a period of from about 0.5 to 3 hours by maintaining the temperature of said clear solution at from about 70° to 100° C.

11. The composition of claim 10 wherein said sulfonated phenolic compound is phenol sulfonic acid.

12. The composition of claim 10 wherein said sulfonated phenolic compound is o-cresol sulfonic acid.

13. An aqueous composition of a water soluble composition of matter comprising
(a) from about 99% to 40% by weight of a water soluble condensate which is the condensate product produced by reacting in an aqueous medium at a temperature of from about 70° to 102° C., a mixture comprising a substantially water insoluble resinous prepolymer formed by reacting at a pH below 4 from about 1 to 4 moles of formaldehyde with one mole of urea and an aqueous solution containing from about 0.7 to 2 moles of at least one sulfonated phenolic compound selected from the group consisting of phenol sulfonic acid, cresol sulfonic acid, xylenol sulfonic acid, resorcinol sulfonic acid and naphthol sulfonic acid per mole of urea utilized in formulating said prepolymer, said mixture having a hydrogen ion concentration of from about 8% to 24%, calculated as weight percent of sulfuric acid based on the weight of said aqueous solution with the proviso that when said prepolymer is formed using one mole of formaldehyde per mole of urea, the hydrogen ion concentration of said mixture is from about 12% to 24% based upon the weight of said aqueous solution, carrying out said reaction by maintaining the temperature of said mixture at from about 70° to 102° C. until the formation of a clear solution, thereafter continually maintaining the temperature of said clear solution at from about 70° to 102° C. by heating for a period of from about 0 to 4 hours, and finally neutralizing said solution to a pH of from about 6.4 to 7.9 after said heating has been discontinued, and
(b) from about 1% to about 60% by weight of a water insoluble condensate, said water insoluble condensate selected from the group consisting of:

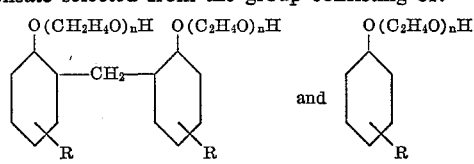

wherein R is selected from the group consisting of alkyl substituents having from 5 to 12 carbon atoms, carbocylic substituents having from 3 to 12 carbon atoms, n is a number from about 1 to 8, and the total number of carbon atoms in the R substituent is at least equal to the number n.

14. The composition of claim 13 wherein said sulfonated phenolic compound is phenol sulfonic acid.

15. The composition of matter of claim 13 wherein said sulfonated phenolic compound is o-cresol sulfonic acid.

16. An aqueous composition of an amphoteric condensate formed by reacting at a temperature of from about 50° to 100° C.
(a) one mole of an anionic condensate, said anionic condensate being produced by reacting in an aqueous medium, at a temperature of from about 70° to 102° C., a mixture comprising a substantially water insoluble resinous prepolymer formed by reacting at a pH of below 4, about 2 to 4 moles of formaldehyde with one mole of urea and a sulfonated phenolic component comprising from about 0.7 to 2 moles of at least one sulfonated phenolic compound selected from the group consisting of phenol sulfonic acid, cresol sulfonic acid, xylenol sulfonic acid, resorcinol sulfonic acid and naphthol sulfonic acid per mole of urea used in formulating said prepolymer, said mixture having a hydrogen ion concentration of from about 8% to 24%, calculated as weight percent sulfuric acid based on the weight of said sulfonated phenolic component with the proviso that when said prepolymer is formed using one mole of formaldehyde per mole of urea, the hydogen ion concentration of said mixture is from about 12% to 24% based upon the weight of said sulfonated phenolic component, carrying out said reaction by maintaining the temperature of said mixture at from about 70° to 102° C. until the formation of a clear solution and thereafter continually maintaining the temperature of said clear solution at from about 70° to 102° C. by heating for a period of from about 0 to 4 hours, with (b) from about 0.02 to 2 moles of at least one material selected from the group consisting of dicyandiamide, guanidine, guanylurea, urea, thiourea, biuret, melamine, ammeline, ammelide, cyanuric acid, ethylene diamine and a cationic aminoplast resin wherein free methylol groups have been interreacted with at least one amino resin base selected from the group consisting of dicyandiamide, guanidine, guanylurea, urea, thiourea, biuret, melamine, ammeline, ammelide, cyanuric acid and ethylene diamine to block said methylol groups with one mole, based on the moles of urea utilized in formulating said prepolymer, of said anionic condensate, said reaction being carried out at a pH of from 6.5 to 7.9.

17. The composition of claim 16 wherein said material (b) is a cationic aminoplast resin.

18. The composition of claim 16 wherein said material (b) is urea.

19. A method of producing an aqueous composition of a water soluble condensate comprising, (a) providing a mixture comprising a substantially water insoluble resinous prepolymer by reacting one mole of urea with from about 1 to 4 moles of formaldehyde at a pH of below 4, and an aqueous solution containing from about 0.7 to 2 moles of at least one sulfonated phenolic compound selected from the group consisting of phenol sulfonic acid, cresol sulfonic acid, xylenol sulfonic acid, resorcinol sulfonic acid and naphthol sulfonic acid per mole of urea utilized in formulating said prepolymer, (b) adjusting the hydrogen ion concentration of said mixture to from about 8% to 25%, calculated as weight percent sulfuric acid based on the weight of said aqueous solution with the proviso that when said prepolymer is formed using one mole of formaldehyde per mole of urea, the hydrogen ion concentration of said mixture is from about 12% to 24% based upon the weight of said aqueous solution, (c) reacting said mixture by heating said mixture to a temperature of from about 70° to 102° C. until the formation of a clear solution, and (d) continually maintaining the temperature of said clear solution at from about 70° to 102° C. by heating for a period of from about 0 to 5 hours after the formation of said clear solution.

20. A method of producing an aqueous composition of a water soluble condensate comprising, (a) providing a mixture comprising a substantially water insoluble resinous prepolymer by reacting one mole of urea with from about 2 to 4 moles of formaldehyde at a pH of below 4, and an aqueous solution containing from about 0.7 to 2 moles of at least one sulfonated phenolic compound selected from the group consisting of phenol sulfonic acid, cresol sulfonic acid, xylenol sulfonic acid, resorcinol sulfonic acid and naphthol sulfonic acid per mole of urea utilized in formulating said prepolymer, (b) adjusting the mixture to a hydrogen ion concentration of from about 8% to 20%, calculated as weight percent sulfuric acid based on the weight of said aqueous solution with the proviso that when said prepolymer is formed using one mole of formaldehyde per mole of urea, the hydrogen ion concentration of said mixture is from about 12% to 24% based upon the weight of said aqueous solution, (c) reacting said mixture by heating said mixture to a temperature from about 70° to 102° C. until the formation of a clear solution, and (d) continually maintaining the temperature of said clear solution at from about 70° to 102° C. by heating for a period of from about 0 to 2 hours, after the formation of said clear solution.

21. A method of producing an aqueous composition of a water soluble condensate comprising, (a) providing a mixture comprising a substantially water insoluble resinous prepolymer by reacting one mole of urea with from about 1 to 4 moles of formaldehyde at a pH of below 4, and an aqueous solution containing from about 0.7 to 2 moles of at least one sulfonated phenolic compound selected from the group consisting of phenol sulfonic acid, cresol sulfonic acid, xylenol sulfonic acid, resorcinol sulfonic acid and naphthol sulfonic acid per mole of urea utilized in formulating said prepolymer, (b) adjusting said mixture of a sulfonated phenolic compound to a hydrogen ion concentration of from about 8% to 24%, calculated as weight percent sulfuric acid based on the weight of said aqueous solution with the proviso that when said prepolymer is formed using one mole of formaldehyde per mole of urea, the hydrogen ion condensation of said mixture is from about 12% to 24% based upon the weight of said aqueous solution, (c) reacting said mixture by heating said mixture to a temperature of from about 70° to 102° C. until the formation of a clear solution, and (d) continually maintaining the temperature of said clear solution at from about 70° to 102° C. by heating for a period of from about 2 to 4 hours, after the formation of said clear solution.

22. A method of producing an aqueous composition of a water soluble condensate comprising, (a) providing a mixture comprising a substantially water insoluble resinous prepolymer by reacting one mole of urea with from about 1 to 4 moles of formaldehyde at a pH of below 4, and an aqueous solution containing from about 0.7 to 2 moles of at least one sulfonated phenolic compound selected from the group consisting of phenol sulfonic acid, cresol sulfonic acid, xylenol sulfonic acid, resorcinol sulfonic acid and naphthol sulfonic acid per mole of urea utilized in formulating said prepolymer, (b) adjusting said mixture to a hydrogen ion concentration of from about 8% to 24%, calculated as weight percent sulfuric acid based on the weight of said aqueous solution with the proviso that when said prepolymer is formed using one mole of formaldehyde per mole of urea, the hydrogen ion concentration of said mixture is from about 12% to 24% based upon the weight of said aqueous solution, (c) reacting said mixture by heating said mixture to a temperature of from about 80° to 102° C. until the formation of a clear solution.

(d) adding 0.1 to 0.3 mole of urea per mole of said sulfonated phenolic compound to said clear solution after the formation of said clear solution, while maintaining the temperature at from about 70° to 100° C., (e) and thereafter continuing said reaction for a period of from 0.5 to 3 hours by maintaining the temperature of said clear solution at from about 70° to 100° C.

(References on following page)

References Cited

UNITED STATES PATENTS

| | | | |
|---|---|---|---|
| 1,237,405 | 8/1917 | Stiasny | 260—49 |
| 1,399,510 | 12/1921 | Moeller | 260—49 |
| 1,841,840 | 1/1932 | Muller et al. | 8—94.24 |
| 2,029,088 | 1/1936 | Turley | 8—94.24 |
| 2,127,068 | 8/1938 | Muller | 8—94.24 |
| 2,242,681 | 5/1941 | Schafer et al. | 260—840 |
| 3,036,877 | 5/1962 | Luck | 8—94.24 |

FOREIGN PATENTS 1,195,492   6/1965   Germany.

SAMUEL H. BLECH, *Primary Examiner.*

WILLIAM H. SHORT, ARTHUR W. WINKELSTEIN,
*Examiners.*

C. A. WENDEL, M. GOLDSTEIN, D. LEVY,
*Assistant Examiners.*